United States Patent
Kuroi et al.

(10) Patent No.: US 10,351,723 B2
(45) Date of Patent: Jul. 16, 2019

(54) METHOD FOR PRODUCING ALUMINUM FLAKE PASTE

(71) Applicant: TOYO ALUMINIUM KABUSHIKI KAISHA, Osaka-shi, Osaka (JP)

(72) Inventors: Shuichi Kuroi, Osaka (JP); Keita Nagano, Osaka (JP); Akihiko Ikeya, Osaka (JP); Masahito Yoshida, Osaka (JP)

(73) Assignee: TOYO ALUMINUM KABUSHIKI KAISHA, Osaka-Shi, Osaka (JP)

( * ) Notice: Subject to any disclaimer, the term of this patent is extended or adjusted under 35 U.S.C. 154(b) by 0 days.

(21) Appl. No.: 14/758,155

(22) PCT Filed: Dec. 26, 2013

(86) PCT No.: PCT/JP2013/084949
§ 371 (c)(1),
(2) Date: Jun. 26, 2015

(87) PCT Pub. No.: WO2014/104219
PCT Pub. Date: Jul. 3, 2014

(65) Prior Publication Data
US 2015/0353754 A1    Dec. 10, 2015

(30) Foreign Application Priority Data
Dec. 28, 2012 (JP) ................. 2012-287330

(51) Int. Cl.
*C09D 17/00* (2006.01)
*C08K 5/17* (2006.01)
(Continued)

(52) U.S. Cl.
CPC .............. *C09D 17/006* (2013.01); *C08K 3/08* (2013.01); *C08K 5/05* (2013.01); *C08K 5/09* (2013.01);
(Continued)

(58) Field of Classification Search
CPC ......... C01P 2006/62; C08K 2003/0812; C08K 3/08; C08K 5/05; C08K 5/09; C08K 5/17;
(Continued)

(56) References Cited

U.S. PATENT DOCUMENTS 3,901,688 A    8/1975    Casey et al.
5,127,951 A    7/1992    Imasato et al.
(Continued)

FOREIGN PATENT DOCUMENTS

CA    2039949    * 10/1991    ............... C09C 1/06
CN    1784477 A    6/2006
(Continued)

*Primary Examiner* — Shuangyi Abu Ali
(74) *Attorney, Agent, or Firm* — Birch, Stewart, Kolasch & Birch, LLP

(57) ABSTRACT

The present invention is a method for producing an aluminum flake paste including a first step of flaking a raw material aluminum powder in an organic solvent containing an aromatic hydrocarbon as a main ingredient to give aluminum flakes, and a second step of treating the aluminum flakes obtained in the first step with an organic compound having a polar group, and forming the treated flakes into a paste.

9 Claims, 1 Drawing Sheet

(51) Int. Cl.
  *C08K 5/09* (2006.01)
  *C08K 5/05* (2006.01)
  *C08K 3/08* (2006.01)
  *C09C 1/64* (2006.01)

(52) U.S. Cl.
  CPC ............ *C08K 5/17* (2013.01); *C09C 1/64* (2013.01); *C09C 1/644* (2013.01); *C09C 1/646* (2013.01); *C09D 17/002* (2013.01); *C01P 2006/62* (2013.01); *C08K 2003/0812* (2013.01)

(58) Field of Classification Search
  CPC ........... C09C 1/64; C09C 1/644; C09C 1/646; C09D 17/00; C09D 17/006
  See application file for complete search history.

(56) References Cited

U.S. PATENT DOCUMENTS

| | | | |
|---|---|---|---|
| 6,454,847 B1 | 9/2002 | Iri et al. | |
| 7,309,391 B2 * | 12/2007 | Nagano | C09D 11/037 106/403 |
| 7,445,667 B2 * | 11/2008 | Nagano | C09C 1/64 106/404 |
| 8,999,054 B2 * | 4/2015 | Nagano | C09C 1/64 106/404 |
| 2004/0250731 A1 | 12/2004 | Nagano et al. | |
| 2006/0014854 A1 | 1/2006 | Minami | |
| 2006/0058419 A1 | 3/2006 | Nagano | |
| 2007/0199478 A1 | 8/2007 | Schlegl et al. | |
| 2009/0041657 A1 | 2/2009 | Miki et al. | |
| 2012/0064291 A1 | 3/2012 | Lai et al. | |
| 2012/0129998 A1 | 5/2012 | Nakao et al. | |

FOREIGN PATENT DOCUMENTS

| | | |
|---|---|---|
| JP | 56-166309 A | 12/1981 |
| JP | 3-294360 A | 12/1991 |
| JP | 10-130545 A | 5/1998 |
| JP | 11-152423 A | 6/1999 |
| JP | 2003-82258 A | 3/2003 |
| JP | 2004-169039 A | 6/2004 |
| JP | 2004-196838 A | 7/2004 |
| JP | 2005-240013 A | 9/2005 |
| JP | 2006-522192 A | 9/2006 |
| JP | 2007-169378 A | 7/2007 |
| JP | 2007-254256 A | 10/2007 |
| JP | 2011-12223 A | 1/2011 |
| KR | 1994-0005837 B1 | 6/1994 |
| KR | 10-2005-0043984 A | 5/2005 |
| KR | 10-2006-0015492 A | 2/2006 |
| WO | WO 03/022934 A1 | 3/2003 |
| WO | WO 2010/100893 A1 | 9/2010 |

\* cited by examiner

METHOD FOR PRODUCING ALUMINUM FLAKE PASTE

TECHNICAL FIELD

The present invention relates to a method for producing an aluminum flake paste for use in a metallic paint or the like.

BACKGROUND ART

Aluminum flakes are used in broad fields as a metallic pigment contained in paint compositions, ink compositions, resin compositions, cosmetics and the like.

In general, aluminum flakes are obtained by wet-grinding an aluminum powder as a raw material (also referred to as "raw material aluminum powder") and a grinding aid in an organic solvent by using a grinding device having grinding media such as a ball mill or an attritor to flake the aluminum powder as a raw material.

The metallic texture of a paint film obtained by applying a paint or the like containing aluminum flakes to a base material is determined principally by the shape, the surface smoothness, the average particle size, the particle size distribution, the average thickness, the thickness distribution, the aspect ratio and so on of the aluminum flakes, and these parameters are adjusted by the combination of the properties of the raw material aluminum powder and the grinding condition. WO 2003/022934 (hereinafter, Patent Document 1) discloses development of a technique of obtaining an aluminum flake pigment having high brightness by adjusting these parameters.

CITATION LIST

Patent Document

PTD 1: WO 2003/022934

SUMMARY OF INVENTION

Technical Problem

The metallic texture is visually recognized by the combination of brightness, luminosity, glittering texture and so on, and there has been a high tendency to desire a paint film of high brightness. In flaking a raw material aluminum powder by using a grinding device having grinding media, there is a general tendency that the time required for flaking is short when the impact applied to the raw material aluminum powder from the grinding media is strong, whereas the time required for flaking is longer when the impact is weak.

For producing aluminum flakes (also referred to as "aluminum flake pigment") that give a paint film of high brightness as described above, an approach of smoothening the surface of the aluminum flakes, and an approach of inhibiting tearing of aluminum flakes due to strong collision with the grinding media are proposed.

As an approach different from the approach of increasing the brightness mainly by changing the grinding media, changing the solvent for use in production of aluminum flakes (also referred to as "grinding solvent") is conducted.

Through examination of various solvents, inventors of the present application unexpectedly found that aluminum flakes having higher brightness compared with those obtainable by conventional methods can be obtained by using, as a grinding solvent, an organic solvent containing an aromatic hydrocarbon as a main ingredient rather than using, as a grinding solvent, an organic solvent containing an aliphatic hydrocarbon (typically mineral spirit) as a main ingredient that is ordinarily used. This is attributable to the fact that by using a solvent containing an aromatic hydrocarbon as a main ingredient, the powdering impact applied to the aluminum flakes from the grinding media is weakened and tearing of the aluminum flakes can be controlled.

However, when the organic solvent containing an aromatic hydrocarbon as a main ingredient is used as the grinding solvent, solubility of fatty acids such as oleic acid and stearic acid in the grinding solvent increases in comparison with the case where an organic solvent containing an aliphatic hydrocarbon as a main ingredient (typically mineral spirit) is used. Fatty acids such as oleic acid and stearic acid are added as a grinding aid at the time of flaking (grinding), and adhere to the surface of the aluminum flakes after formation of flakes to play roles of imparting parallel alignment to the aluminum flakes, inhibiting aggregation, and protecting the surface of the aluminum flakes. However, if the solubility of these compounds in the grinding solvent increases, the amount of fatty acid adhered to the surface of the aluminum flakes decreases. Accordingly, aggregation occurs with the lapse of time, and hence the storage stability of the aluminum flake paste deteriorates. Accordingly, it has been considered difficult to put the method for producing an aluminum flake paste using an organic solvent containing, as a main ingredient, an aromatic hydrocarbon as a grinding solvent to practical use.

The present invention was devised in consideration of the aforementioned current circumstances, and it is an object of the present invention to provide a method for producing an aluminum flake paste imparting high brightness while keeping the storage stability.

Solution to Problem

Based on the aforementioned findings, the present inventors examined why the aluminum flake paste produced by the production method using an organic solvent containing, as a main ingredient, an aromatic hydrocarbon as a grinding solvent has high brightness. The inventors focused on the difference in shape between the aluminum flakes obtained by using, as a grinding solvent, an organic solvent containing an aromatic hydrocarbon as a main ingredient and the aluminum flakes obtained by using conventional mineral spirit as a grinding solvent, and measured the circularity of these. As a result, the inventors revealed that the aluminum flakes obtained by using, as a grinding solvent, an organic solvent containing an aromatic hydrocarbon as a main ingredient are more approximate to a perfect circle. The inventors also found that the aluminum flakes that are more approximate to a perfect circle give higher brightness. Further, the inventors found that it is effective to adhere an organic compound having a polar group such as a fatty acid to the surface of the aluminum flakes in a separate step for inhibiting aggregation of the aluminum flakes obtained by using, as a grinding solvent, an organic solvent containing an aromatic hydrocarbon as a main ingredient and improving the storage stability, and accomplished the present invention.

Specifically, the present invention is a method for producing an aluminum flake paste including a first step of flaking a raw material aluminum powder in an organic solvent containing an aromatic hydrocarbon as a main ingredient to give aluminum flakes, and a second step of treating the aluminum flakes obtained in the first step with an organic compound having a polar group, and forming the treated flakes into a paste.

Preferably, the organic compound having a polar group is at least one selected from the group consisting of a fatty acid, an aliphatic amine, a fatty acid amide, an aliphatic alcohol, and an ester of a fatty acid and an aliphatic alcohol.

Further, the present invention is an aluminum flake paste containing aluminum flakes, wherein letting the water covering area (cm$^2$/g) of the whole of the aluminum flakes contained in the aluminum flake paste be A, and the circularity of the aluminum flakes having a surface area greater than or equal to 250 μm$^2$ be B, the ratio A/B is greater than or equal to 6000 (cm$^2$/g).

Preferably, the aluminum flake paste contains the organic compound having a polar group in an amount of greater than or equal to 0.5% by mass in terms of carbon amount.

Preferably, the organic compound having a polar group is at least one selected from the group consisting of a fatty acid, an aliphatic amine, a fatty acid amide, an aliphatic alcohol, and an ester of a fatty acid and an aliphatic alcohol.

Further, the present invention is a metallic colored matter obtained by using the aluminum flake paste according to any of the above descriptions.

Advantageous Effects of Invention

The method for producing an aluminum flake paste of the present invention exerts the advantageous effect of providing an aluminum flake paste capable of imparting high brightness while keeping the storage stability by having the aforementioned configuration.

DESCRIPTION OF EMBODIMENTS

Figure 1:
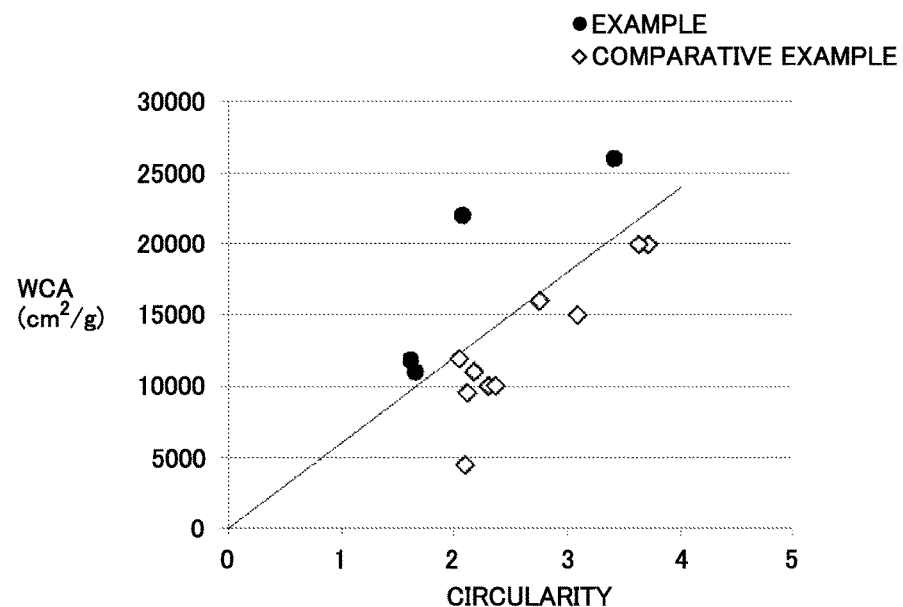
FIG. 1 is a scatter diagram showing a relationship between the water covering area (WCA) and the circularity in Examples 1 to 4 and Comparative Examples 1 to 10.

Hereinafter, the present invention will be described in more detail by indicating the embodiments.

<Method for Producing Aluminum Flake Paste>

A method for producing an aluminum flake paste of the present invention is characterized in that it includes a first step of flaking a raw material aluminum powder in an organic solvent containing an aromatic hydrocarbon as a main ingredient to give aluminum flakes, and a second step of treating the aluminum flakes obtained in the first step with an organic compound having a polar group, and forming the treated flakes into a paste. The production method of the present invention may include other steps as far as the first step and the second step are included. As such other steps, a solid-liquid separation step such as a filtering operation or a screening operation can be recited.

<First Step>

The first step of the production method of the present invention is a step of flaking a raw material aluminum powder in an organic solvent containing an aromatic hydrocarbon as a main ingredient to give aluminum flakes. The raw material used in the first step, and the condition of the first step will be described below.

For flaking a raw material aluminum powder, a grinding device having grinding media is used. The term "flaking" used herein means forming a powder in a particulate form into a flake form (scale form) by means of a grinding device or the like. The grinding device used in the present invention is not particularly limited in terms of its type, and a grinding device conventionally known in the art can be preferably used. For example, a grinding device of the attritor type having a revolving arm inside, or a cylindrical ball mill can be preferably used. Among the above exemplary grinding devices, a cylindrical ball mill is particularly preferred because aluminum flakes having the quality of higher brightness can be obtained.

In the production method of the present invention, when a ball mill is used, the number of revolutions of the ball mill is preferably less than or equal to 95% of the critical number of revolutions. The term "critical number of revolutions" used herein refers to the number of revolutions at or above which balls (grinding media) are fixed to the inner wall of the ball mill by the centrifugal force, and is represented by the following formula (1).

$$n=[1/(2\pi)]\times(g/r)^{1/2} \qquad (1)$$

wherein n stands for the number of revolutions (rpm), g stands for the gravitational acceleration (3528000 cm/min$^2$), and r stands for the radius of the ball mill (cm).

If the number of revolutions of the ball mill exceeds 95% of the critical number of revolutions, the powdering effect is superior to the grinding effect, so that sufficient flaking cannot be achieved, and inversely large flake particles are fragmented to give extra fine particles. Accordingly, the brightness of the paint film containing the aluminum flake paste tends to deteriorate. In particular, when steel balls having a diameter less than or equal to 1 mm are used as the grinding media, the impulsive force due to collision of the grinding media is large at the number of revolutions of the ball mill that is approximate to the critical number of revolutions. This shortens the service life of the grinding media and tends to interfere with the continuous use. This is because a grinding medium formed of a steel ball having a diameter less than or equal to 1 mm does not generally have a cured film formed on its surface. By keeping the number of revolutions of the ball mill less than or equal to 95% of the critical number of revolutions, it is possible to extend the service life of the grinding media.

The grinding time is not particularly limited, and may be appropriately determined according to the diameter of the grinding media, the mass of the grinding media, the amount of the grinding solvent, the number of revolutions and so on. It is typically 3 to 48 hours.

<Grinding Media>

As the grinding media used in the aforementioned grinding device, those made of various materials including, but not particularly limited to, steel balls, stainless balls, glass balls and ceramic balls can be used, however, spherical media made of materials containing steel are preferably used from the view point of specific gravity and economy. While the grinding media used herein are preferably spherical, the grinding media are not necessarily required to be perfectly spherical, and are only required to be substantially spherical grinding media. The size of the grinding media can be appropriately selected according to the aluminum flakes that are intended to be finally obtained, and preferably ranges from 0.3 mm to 5.0 mm in diameter. When the aluminum flakes that are intended to be finally obtained have a relatively small particle size and high brightness, the diameter preferably ranges from 0.3 mm to 1.0 mm, and more preferably ranges from 0.5 mm to 0.8 mm particularly in the case of using steel balls as the grinding media to make it possible to flake the fine raw material aluminum powder. If the diameter exceeds 1.0 mm, the fine raw material aluminum powder is trapped between grinding media, and the raw material aluminum powder is difficult to be ground, and can be failed to be flaked efficiently. On the other hand, if the diameter is less than 0.3 mm, the mass of the grinding media is so light that the grinding power is poor, and too long a time is required for flaking, so that the raw material aluminum powder can be substantially failed to be flaked. As the grinding media, a mixture of two or more kinds of grinding media having different diameters may be used. Grinding media having a diameter exceeding 1.0 mm may be contained in the grinding device for use in the present invention. The amount of the grinding media can be varied according to the amount of the raw material aluminum powder to be put into the grinding device as will be described later.

<Raw Material Aluminum Powder>

In the production method of the present invention, the raw material aluminum powder as a raw material of the aluminum flake paste is not particularly limited. The powder may be composed exclusively of aluminum, or may be composed of an aluminum-based alloy, and the purity of aluminum is not particularly limited. For further improving the gloss of a paint film and a printed matter, it is typically preferred to use pure aluminum, and pure aluminum having a purity greater than or equal to 99.9% by mass is further preferred.

The amount of oxygen contained in the raw material aluminum powder varies depending on the particle size or the shape of the raw material aluminum powder. The amount is preferably, but not limited to, less than or equal to 0.5% by mass. If the oxygen amount exceeds 0.5% by mass, the oxide film is stiff so that production of thin flakes tends to be difficult because of reduction in ductility.

Although the raw material aluminum powder for use in the production method of the present invention can be obtained by any production method, an atomized aluminum powder is preferred from the view point of the availability or the cost.

An atomized aluminum powder is a raw material aluminum powder that is obtained by a conventionally known atomizing method, and non-limitative examples of the atomizing medium include the air, nitrogen, argon gas, carbon dioxide gas, helium gas and a mixed gas containing at least one kind of these gases. Also, liquids such as water may be used as the atomizing medium. Among these, a raw material aluminum powder that is obtained by an atomizing method using argon gas or nitrogen gas as an atomizing medium is particularly preferred because it has a shape approximate to a sphere, and it facilitates production of aluminum flakes having high circularity by using such a raw material aluminum powder.

The shape of the raw material aluminum powder for use in the production method of the present invention is not particularly limited, and may be any of a spherical shape, a flat shape, a plate shape, a teardrop shape, a needle shape, a spheroidal shape, and an indeterminate shape. However, those more approximate to a spherical shape are more preferred because the circularity is higher and it becomes easy to obtain aluminum flakes having high brightness.

The average particle size of the raw material aluminum powder for use in the production method of the present invention is not particularly limited, and is preferably greater than or equal to 1.0 μm and less than or equal to 50.0 μm, more preferably ranges from 1.0 to 10.0 μm, and further preferably ranges from 1.0 to 6.0 μm. In the present invention, the average particle size (D50) can be determined by calculating the volume average from distribution of particle sizes measured by the laser diffraction method.

If $D50_{Al}$ exceeds 50.0 μm, the average particle size of the aluminum flakes after flaking is large, so that the orientation of the aluminum flakes can be disarranged at the time of forming a paint film containing the aluminum flake paste, graininess appears on the surface of the paint film due to projection of the aluminum flakes, or the design of the paint film is not favored depending on its use because the glittering texture of the paint film is too strong. On the other hand, if $D50_{Al}$ is less than 1.0 μm, there is a tendency that the raw material aluminum powder cannot be flaked efficiently and sufficient paint film brightness cannot be obtained particularly when grinding media having a small diameter are used (for example, when flaking is conducted by using grinding media ranging from 0.3 to 1.0 mm).

<Ratio Between Average Particle Size of Raw Material Aluminum Powder and Diameter of Grinding Media>

In the production method of the present invention, while the ratio ($D50_{Al}/D_B$) between the average particle size of the raw material aluminum powder ($D50_{Al}$) and the diameter of the grinding media ($D_B$) is not particularly limited, it preferably ranges from 0.001 to 0.02, and more preferably ranges from 0.0015 to 0.008 when grinding media of steel balls are used. The value of $D50_{Al}/D_B$ within the above range makes it possible to flake a finer raw material aluminum powder, and improves the brightness of the aluminum flake paste. If the value of $D50_{Al}/D_B$ is less than 0.001, the gap of the grinding media of steel balls is too large relative to the raw material aluminum powder. As a result, the raw material aluminum powder cannot be flaked efficiently, so that fine aluminum flakes that are not flaked enough can be contained, and grinding for a long time is required to advance the flaking, during which tearing of large aluminum flakes can occur, and the brightness of the aluminum flake paste tends to decrease. On the other hand, if the value of $D50_{Al}/D_B$ exceeds 0.02, the steel ball grinding media are so small in relation to the raw material aluminum powder that the grinding power which is correlated with the mass of each steel ball of the grinding media is insufficient, and the raw material aluminum powder cannot be flaked efficiently. Therefore, the brightness of the paint film tends to decrease.

<Mass Ratio Between Raw Material Aluminum Powder and Grinding Media>

In the production method of the present invention, while the ratio ($W_B/W_{Al}$) between the mass ($W_B$ (g)) of the grinding media and the mass ($W_{Al}$ (g)) of the raw material aluminum powder at the time of flaking (grinding) is not particularly limited, it is preferably within the range from 20 to 200. If the ratio is less than 20, the productivity tends to decrease. If the ratio exceeds 200, the grinding time is very long, and the slurry viscosity increases too much during the grinding, resulting in that the efficiency of flaking tends to decrease.

<Organic Solvent Containing Aromatic Hydrocarbon as Main Ingredient>

In the production method of the present invention, an organic solvent containing an aromatic hydrocarbon as a main ingredient is used as the grinding solvent.

In producing aluminum flakes and an aluminum flake paste, an organic solvent called mineral spirit containing an aliphatic hydrocarbon as a main ingredient is generally used as a grinding solvent. On the other hand, the present invention is characterized in that aluminum flakes that give higher brightness than those obtainable by conventional methods can be obtained by using, as the grinding solvent, an organic solvent containing an aromatic hydrocarbon as a main ingredient in place of the mineral spirit.

That is, the production method of the present invention advantageously allows production of an aluminum flake paste having high brightness. This is attributable to the fact that by using, as the grinding solvent, the organic solvent containing an aromatic hydrocarbon as a main ingredient, the powdering impact applied to the aluminum flakes from the grinding media is weakened, and tearing of the aluminum flakes is less likely to occur.

The wording "containing an aromatic hydrocarbon as a main ingredient" means containing greater than or equal to 50% by mass of an aromatic hydrocarbon in the mass of the whole organic solvent. More preferably, greater than or equal to 70% by mass, further preferably greater than or equal to 90% by mass, or the whole of the organic solvent may be the aromatic hydrocarbon.

Although the kind of the aromatic hydrocarbon is not particularly limited, generally, those having a high boiling point greater than or equal to 120° C. are preferably used for the safety reason including inflammability to the grinding solvent. Non-limitative examples of a usable aromatic hydrocarbon include 1,2,4-trimethylbenzene, 1,3,5-trimethylbenzene, xylene, cumene, and naphthalene. It may have a substituent such as a nitro group or a halogen group.

The organic solvent containing an aromatic hydrocarbon as a main ingredient in the production method of the present invention, that also contains other organic solvents, can be used as far as it contains an aromatic hydrocarbon as a main ingredient.

<Ratio Between Mass of Raw Material Aluminum Powder and Volume of Organic Solvent Containing Aromatic Hydrocarbon as Main Ingredient>

In the production method of the present invention, although the ratio ($W_{Al}/W_{sol}$ (kg/L)) between the mass ($W_{Al}$ (kg)) of the raw material aluminum powder and the volume ($W_{sol}$ (L)) of the organic solvent containing an aromatic hydrocarbon as a main ingredient is not particularly limited, it preferably ranges from 0.1 to 0.3 kg/L, and more preferably ranges from 0.14 to 0.20 kg/L. If $W_{Al}/W_{sol}$ is less than 0.1 kg/L, the slurry viscosity at the time of flaking is low, and the grinding impact of the grinding media on the raw material aluminum powder is weakened due to the presence of the excessive organic solvent, and the efficiency of flaking decreases. Accordingly, the raw material aluminum powder tends not to be flaked uniformly. On the other hand, if $W_{Al}/W_{sol}$ exceeds 0.3 kg/L, the slurry viscosity at the time of grinding is too high, and motion of the grinding media is restrained, so that the raw material aluminum powder tends not to be flaked uniformly.

<Grinding Aid>

In the production method of the present invention, it is preferred to conduct flaking of the raw material aluminum powder in the presence of a grinding aid. As the grinding aid, those conventionally known can be used without particular limitation. For example, a fatty acid such as oleic acid or stearic acid, an aliphatic amine, a fatty acid amide, an aliphatic alcohol and an ester of a fatty acid and an aliphatic alcohol can be preferably used.

Such a grinding aid has the effect of inhibiting unnecessary oxidation of the surface of the aluminum flakes and improving the brightness of the aluminum flake paste. While the amount of the grinding aid added at the time of flaking (grinding) is not particularly limited, it is preferably within the range from 0.1 to 20 parts by mass, more preferably within the range from 0.5 to 10 parts by mass with respect to 100 parts by mass of the raw material aluminum powder.

If the amount of the grinding aid added is less than 0.1 part by mass, aluminum flakes can aggregate, and the brightness of the aluminum flake paste can decrease. In addition, insufficient lubricity in flaking the raw material aluminum powder can cause tearing of the aluminum flakes, and a consequent decrease in brightness. On the other hand, if the amount of the grinding aid added exceeds 20 parts by mass, the physical properties of the paint, especially the adhesion properties can be deteriorated. Moreover, the raw material aluminum powder are difficult to be flaked, and the grinding time can be disadvantageously elongated.

<Separation of Aluminum Flakes>

In the first step, after obtaining the aluminum flakes by flaking the raw material aluminum powder, for collecting the aluminum flakes, a solid-liquid separation operation such as a filtering operation or a screening operation may be conducted. For example, the flaking (grinding) can be followed by an operation of washing out the slurry containing the aluminum flakes in the ball mill with mineral spirit and subjecting it to a vibration screen, and solid-liquid separating the passing slurry by a pan filter to give aluminum flakes (as a filter cake, in this case). The term "filter cake" used herein refers to a semi-solid substance that remains after removal of the organic solvent containing an aromatic hydrocarbon. In the filtering operation or the screening operation, grinding media can be removed from the organic solvent containing an aromatic hydrocarbon.

The filtering operation or the screening operation can be appropriately conducted in each of the later-described steps without limited to the first step.

<Solvent Replacement or Solvent Addition>

In the first step, after obtaining the aluminum flakes by flaking the raw material aluminum powder, the organic solvent containing an aromatic hydrocarbon as a main ingredient may be replaced by a different solvent by solvent replacement or solvent addition. At this time, the organic solvent containing an aromatic hydrocarbon as a main ingredient can be changed to a solvent having lower solubility with respect to a later-described "organic compound having a polar group". This makes it possible to further suppress dissolution of the organic compound having a polar group in the solvent in the later-described second step. As will be described later, although the organic compound having a polar group has an effect of improving the storage stability of the aluminum flake paste regardless of whether it is adhered to the surface of the aluminum flakes or it is contained in the solvent, it is more preferred that the organic compound is adhered to the surface of the aluminum flakes from the view point of further improving the storage stability. Accordingly, by changing the solvent, it is possible to suppress dissolution of the organic compound having a polar group in the solvent, and to increase the adhesion amount to the surface of the aluminum flakes, and thus to improve the effect of protecting the surface of the aluminum flakes.

<Second Step>

The second step of the production method of the present invention is a step of treating the aluminum flakes obtained in the first step with an organic compound having a polar group, and forming the treated flakes into a paste. The wording "treat with an organic compound having a polar group" used herein refers to a step intended to adhere the organic compound having a polar group to the surface of the aluminum flakes. When the second step is executed in the condition that a paste-forming solvent is added to the aluminum flakes, the organic compound having a polar group may be contained in the paste-forming solvent while it is adhered to the surface of the aluminum flakes. Hereinafter, raw materials, conditions and so on used in the second step will be described.

<Organic Compound Having Polar Group>

In the second step of the production method of the present invention, an operation of treating the aluminum flakes obtained in the first step with an organic compound having a polar group is conducted.

When an organic solvent containing an aromatic hydrocarbon as a main ingredient is used as a grinding solvent, solubility in fatty acids such as oleic acid and stearic acid is higher in comparison with the case where an aliphatic hydrocarbon (typically mineral spirit) is used as a grinding solvent. Fatty acids such as oleic acid and stearic acid are added as a grinding aid at the time of flaking (grinding), and adhere to the surface of the aluminum flakes after formation of flakes to play roles of imparting parallel alignment to the aluminum flakes, inhibiting aggregation, and protecting the surface of the aluminum flakes. However, increased solubility in the grinding solvent results in reduction in the amount of fatty acids adhered to the surface of the aluminum flakes. Accordingly, aggregation occurs with the lapse of time, and hence the storage stability of the aluminum flake paste deteriorates. However, by treating the aluminum flakes obtained in the first step with an organic compound having a polar group in the production method of the present invention, it is possible to improve the storage stability of the aluminum flake paste.

That is, the production method of the present invention shows the excellent effect that an aluminum flake paste having excellent storage stability can be obtained. This is because by treatment with an organic compound having a polar group, aggregation of the aluminum flakes in the aluminum flake paste is inhibited.

As described above, the organic compound having a polar group has the effect of improving the storage stability regardless of whether it is adhered to the surface of the aluminum flakes or it is contained in the paste-forming solvent. However, for improvement of the storage stability, it is more preferred that the organic compound having a polar group is adhered to the surface of the aluminum flakes.

The organic compound having a polar group for use in the production method of the present invention is an organic compound having a polar group such as a hydroxyl group, a carboxyl group, an amino group, an amide group (amide bond), or an ester group (ester bond), however, its chemical structure is not particularly limited. Preferably, at least one organic compound selected from the group consisting of a fatty acid, an aliphatic amine, a fatty acid amide, an aliphatic alcohol, and an ester of a fatty acid and an aliphatic alcohol can be used. The organic compound having a polar group may be the same or different from the compound that is added as a grinding aid in the first step.

Examples of the fatty acid include caprylic acid, capric acid, lauric acid, myristic acid, oleic acid, stearic acid, linoleic acid, arachidonic acid, and behenic acid.

Examples of the aliphatic amine include lauryl amine, myristyl amine, palmityl amine, and stearyl amine.

Examples of the fatty acid amide include lauric acid amide, palmitic acid amide, oleic acid amide, stearic acid amide, and behenic acid amide.

Examples of the aliphatic alcohol include capryl alcohol, lauryl alcohol, myristyl alcohol, oleyl alcohol, stearyl alcohol, and behenyl alcohol.

Examples of the ester of a fatty acid and an aliphatic alcohol include methyl laurate, methyl oleate, methyl stearate, octyl stearate, isopropyl myristate, butyl stearate, octyl palmitate, octyl oleate, and isopropyl palmitate.

Among these, fatty acids, aliphatic amines, fatty acid amides, aliphatic alcohols and esters of fatty acids and aliphatic alcohols each having greater than or equal to 12 carbon atoms are preferred. By using an organic compound having greater than or equal to 12 carbon atoms, it is possible to further heighten the storage stability. The organic compound more preferably has greater than or equal to 14 carbon atoms.

While the amount of the organic compound having a polar group for use in the second step is not particularly limited, it is preferably within the range of greater than or equal to 0.5 part by mass and less than or equal to 20 parts by mass with respect to 100 parts by mass of the aluminum flakes. If this amount is less than 0.5 part by mass, the effect of improving the storage stability of the aluminum flake paste is poor, and the brightness can be decreased due to deterioration in storage stability with the lapse of time. If the aforementioned amount exceeds 20 parts by mass, adhesion properties of a paint film when the aluminum flakes are blended in a paint can be impaired.

Non-limitative examples of the operation method of treating the aluminum flakes with an organic compound having a polar group include a method of adhering an organic compound having a polar group to the surface of the aluminum flakes by bringing the powdery or pasty aluminum flakes into contact with the organic compound having a polar group or mixing the powdery or pasty aluminum flakes with the organic compound having a polar group. When the second step is conducted in the condition that the aluminum flakes are contained in the solvent, a method of adding the organic compound having a polar group at the same time or after dispersing the aluminum flakes in a large amount of solvent in the form of a slurry, to adhere the organic compound having a polar group to the surface of the aluminum flakes can be mentioned. When the powdery or pasty aluminum flakes are used without being dispersed in a solvent, non-limitative examples of the method for contacting and mixing include a method of mixing a paste by means of a kneading machine such as a kneader mixer. In both of the cases where the powdery or pasty aluminum flakes are used without being dispersed in a solvent, and where they are dispersed in a solvent, it is possible to bring the organic compound having a polar group into contact with the aluminum flakes at a higher concentration in comparison with the case where the organic compound having a polar group is added as a grinding aid at the time of flaking in the first step. Therefore, it is possible to adhere the organic compound having a polar group to the surface of the aluminum flakes more efficiently.

Although the organic compound having a polar group has the effect of improving the storage stability of the aluminum flake paste regardless of whether it is adhered to the surface of the aluminum flakes or it is contained in the solvent, it is more preferably adhered to the surface of the aluminum flakes to improve the storage stability. Therefore, by efficiently adhering the organic compound having a polar group to the surface of the aluminum flakes, it is possible to improve the storage stability of the aluminum flake paste.

While the time for treating the aluminum flakes with the organic compound having a polar group is not particularly limited, it preferably ranges from 5 minutes to 10 hours both in the case of using the powdery or pasty aluminum flakes without being dispersed in a solvent, and in the case of using the aluminum flakes dispersed in a solvent. It is advantageous to select this range in the points that each of the aluminum flakes is uniformly treated, the storage stability is improved, and the brightness of the flakes can be retained.

In the case of using a solvent in the treatment of the aluminum flakes with the organic compound having a polar group, the kind of the solvent is not particularly limited. For example, a polar solvent such as water, an alcohol, or an ether may be used, and a nonpolar solvent such as an aromatic hydrocarbon or an aliphatic hydrocarbon may be used. However, for avoiding the influence of corrosion by the solvent on the aluminum flakes, a nonpolar solvent is preferably used.

As such a nonpolar solvent, an aliphatic hydrocarbon or an aromatic hydrocarbon having a boiling point approximately ranging from 120° C. to 250° C., or a mixture thereof can be preferably used. Non-limitative concrete examples thereof include normal paraffin, isoparaffin, xylene, sorbent naphtha, kerosene, mineral spirit, and petroleum benzine.

<Forming into a Paste>

The term "forming into a paste" used in the second step of the present invention refers to elevating the viscosity of the slurry containing the aluminum flakes in the first step (when the aluminum flakes are obtained as a filter cake, transforming it into a fluid of high viscosity). This operation is typically conducted by adding a paste-forming solvent. However, when the viscosity of the mixed system is high in the treatment by adding the organic compound having a polar group to the aluminum flakes, the solvent that forms the mixed system is regarded as a paste-forming solvent, and there is no need to add a paste-forming solvent separately. When the viscosity of the mixed system is low in the treatment by adding the organic compound having a polar group to the aluminum flakes, the viscosity of the mixed system can be elevated by adding a paste-forming solvent to the mixed system, or by replacing the solvent that forms the mixed system with a paste-forming solvent.

The term "paste-forming solvent" used herein refers to a compound to be mixed with aluminum flakes for paste forming. The paste-forming solvent may be the organic solvent containing an aromatic hydrocarbon as a main ingredient used in the first step. Alternatively, when the second step involves a solvent, the solvent may be directly used as the paste-forming solvent, or any other solvent may be used as a paste-forming solvent by solvent addition or solvent replacement as described above. Non-limitative examples of the material that can be used for the paste-forming solvent include a glycol ether solvent as well as an aliphatic hydrocarbon (e.g., mineral spirit) and an organic solvent containing an aromatic hydrocarbon as a main ingredient. While the content of the paste-forming solvent in the aluminum flake paste is not particularly limited, it is preferably greater than or equal to 15% by mass and less than or equal to 50% by mass in the point that the storage stability can be improved, and the dispersibility of the aluminum flakes in a paint can be improved in producing the paint. It is more preferably greater than or equal to 25% by mass and less than or equal to 40% by mass.

<Addition of Antioxidant>

In the production method of the present invention, an operation of adding an antioxidant may be included.

If the grinding aid such as a fatty acid or the organic compound having a polar group adhered to the surface of the aluminum flakes has an unsaturated double bond in its structure, it has such a nature that it can be denatured or polymerized (transformed) due to radical reaction. This transformation can cause aggregation of the aluminum flakes, and adversely influence on the parallel arrangement of the aluminum flakes to deteriorate the brightness.

Such transformation can be stopped or inhibited by adding an antioxidant.

The stage in the production process at which the operation of adding an antioxidant is to be conducted can be appropriately determined according to the kinds of the grinding aid and the organic compound having a polar group added to the aluminum flakes. Concretely, when the one having an unsaturated double bond in its structure that easily causes radical reaction, e.g., an unsaturated fatty acid is used as the grinding aid, an antioxidant should be added during flaking in the first step. When the one having an unsaturated double bond in its structure that easily causes radical reaction is used as the organic compound having a polar group in the second step, an antioxidant should be added during the second step or after completion of the second step.

The antioxidant that can be used in the present invention may be any compound that has a function of supplying the radical generated by the transformation of an unsaturated fatty acid or the like with an electron or a hydrogen atom to stop the radical chain reaction. Examples of typical antioxidants that can be used in the present invention include synthetic antioxidants such as phenol compounds, alicyclic compounds having a carbonyl group and a hydroxyl group, aromatic amino compounds, organic sulfur compounds, and phosphite compounds, and natural antioxidants.

As a concrete example of the method for adding an antioxidant, the compounds and the method as described in Japanese Patent Laying-Open No. 10-306232 can be employed.

<Other Steps>

In the present invention, various other steps may be included as far as the first step and the second step are included. Exemplary steps include a solid-liquid separation step such as a filtering operation or a screening operation.

<Aluminum Flake Paste>

The aluminum flake paste of the present invention can contain a paste-forming solvent as well as aluminum flakes. Letting the water covering area ($cm^2/g$) of the whole of the aluminum flakes contained in the aluminum flake paste be A, and the circularity of the aluminum flakes having a surface area greater than or equal to 250 $\mu m^2$ be B, the ratio A/B is greater than or equal to 6000 ($cm^2/g$). Such an aluminum flake paste can be prepared by the method for producing an aluminum flake paste as described above.

Hereinafter, the aluminum flake paste of the present invention will be described.

<Aluminum Flakes>

The composition of the aluminum flakes is identical to the composition of the raw material aluminum powder in the aforementioned method for producing an aluminum flake paste. That is, the composition of the aluminum flakes is not particularly limited, and the aluminum flakes may be composed exclusively of aluminum, or may be composed of an aluminum-based alloy. Also the purity of the aluminum is not particularly limited, however, for further increasing the gloss of a paint film or a printed matter containing the aluminum flake paste, pure aluminum is generally preferred, and pure aluminum having a purity greater than or equal to 99.9% by mass is more preferred.

While the content of the aluminum flakes in the aluminum flake paste is not particularly limited, a content greater than or equal to 50% by mass and less than or equal to 85% by mass with respect to the aluminum flake paste is preferred because the effect of improving the storage stability and improving the dispersibility of the aluminum flakes in a paint at the time of producing a paint is obtained. More preferably, the content is greater than or equal to 60% by mass and less than or equal to 75% by mass.

The aluminum flakes of the present invention include aluminum flakes having a surface area greater than or equal to 250 μm².

<Ratio Between Circularity and Water Covering Area of Aluminum Flakes>

In the aluminum flake paste of the present invention, letting the water covering area (cm²/g) of the whole of the aluminum flakes contained in the aluminum flake paste be A, and the circularity of the aluminum flakes having a surface area greater than or equal to 250 μm² be B, it is required that the ratio A/B is greater than or equal to 6000 (cm²/g).

Here, the circularity is a measure that indicates how approximate to a perfect circle the shape of the surface having the largest area of aluminum flakes is. A perfect circle is indicated by a circularity of 1, and the circularity moves away from 1 as the shape moves away from a perfect circle.

The circularity of the aluminum flakes having a surface area greater than or equal to 250 μm² can be determined in the following manner. Specifically, vanish (trademark: "Autoclear," available from NIPPONPAINT Co., Ltd.) is added to the aluminum flake paste (solid content: 0.2 g) and stirred, and the obtained paint composition is applied to a hiding power test paper by means of a one-mill doctor blade, to give a painted chart. Then, after drying the painted chart, a picture of aluminum flakes is taken by a digital microscope (trademark: "VHX-1000," available from KEYENCE Corporation), and aluminum flakes having a surface area greater than or equal to 250 μm² are selected by image analysis measurement processing software (trademark: "Image-Pro Plus version 4.0," available from Planetron, Inc.). The circularity is measured for all of the selected flakes, and an average value thereof is adopted to calculate the circularity of the aluminum flakes having a surface area greater than or equal to 250 μm².

While the range of the circularity of the aluminum flakes having a surface area greater than or equal to 250 μm² contained in the aluminum flake paste of the present invention is not particularly limited, a circularity closer to 1 is preferred. A more preferred circularity is greater than or equal to 1.0 and less than or equal to 1.8.

The value of the water covering area (WCA) depends not only on the aluminum flakes having a surface area greater than or equal to 250 μm², but also on the properties of the whole of the aluminum flakes contained in the aluminum flake paste. The water covering area can be determined according to JIS K 5906:1998 after conducting a predetermined preliminary treatment (collect the aluminum flake paste on a glass filter, wash the paste four times with hexane, and dry the paste) on the aluminum flake paste. While the method of measuring a water covering area described in JIS is for those of the leafing type, the aluminum flake paste of the present invention also includes those of the non-leafing type. Accordingly, in the method of measuring a water covering area in the present invention, the sample of the aluminum flakes is preliminarily treated with a solution of 5% stearic acid in mineral spirit (leafing treatment). The measurement is conducted in the same manner as in the case of the leafing type described in JIS K 5906:1998 except that this preliminary treatment is conducted.

While the range of the water covering area is not particularly limited, it is preferably greater than or equal to 5000 cm²/g and less than or equal to 800000 cm²/g, more preferably greater than or equal to 6000 cm²/g and less than or equal to 50000 cm²/g. This range is advantageous in terms of brightness. If this value is less than 5000 cm²/g, the hiding power of the aluminum flake paste is small, and a disadvantage can arise in improving the brightness. If the value exceeds 800000 cm²/g, although the aluminum flakes have hiding power, they are too thin in conducting grinding, tearing of the aluminum flakes is more likely to occur, and a disadvantage can arise in improving the brightness.

In the aluminum flake paste of the present invention, letting the water covering area (cm²/g) of the whole of the aluminum flakes contained in the aluminum flake paste be A, and the circularity of the aluminum flakes having a surface area greater than or equal to 250 μm² be B, the ratio A/B is greater than or equal to 6000 (cm²/g), and preferably greater than or equal to 6500 (cm²/g). While the upper limit of the ratio A/B is not particularly limited, the ratio is preferably less than or equal to 30000 (cm²/g) because the nature of the aluminum flake paste is sufficiently approximate to that of a perfect circle, and the brightness increases.

The aluminum flake paste of the present invention imparts high brightness because each particle of the aluminum flakes has a shape that is approximate to a perfect circle in contrast with the conventional aluminum flake paste having a comparable water covering area. Although the reason why the aluminum flakes having a shape approximate to a perfect circle impart the high brightness is not clear, one supposable reason is that the aluminum flake paste contains less aluminum flakes having such a shape that the circularity is far from 1 as a result of tearing at the time flaking (grinding) the aluminum flakes because a lot of aluminum flakes have a shape approximate to a perfect circle.

<Average Particle Size, Average Thickness and Aspect Ratio of Aluminum Flakes>

The average particle size of the aluminum flakes of the present invention can be determined by calculating the volume average from the particle size distribution measured by a laser diffraction method. While the average particle size of the aluminum flakes of the present invention is not particularly limited, it is preferably greater than or equal to 1 μm and less than or equal to 50 μm. Within this range, advantageously, the brightness can be further improved, and there is no fear that the appearance is impaired because the aluminum flakes are less likely to project from the paint film containing the aluminum flake paste. This is particularly desired in automobile applications or the like. The average particle size of the aluminum flakes is more preferably greater than or equal to 3 μm and less than or equal to 20 μm, further preferably greater than or equal to 5 μm and less than or equal to 15 μm.

The average thickness (μm) of the aluminum flakes of the present invention is calculated according to the following formula from the measurement of water covering area (WCA) per 1 g of aluminum flakes. The measuring method of water covering area (WCA) is as described above.

$$\text{Average thickness (μm)}=10^4/[2.5 \text{ (g/cm}^3\text{)} \times \text{WCA (cm}^2\text{/g)}]$$

Here, the reason for using 2.5 (g/cm³) is as follows. Although the metal density (specific gravity) of aluminum is 2.7 (g/cm³), when the aluminum flakes are arranged, there is a gap between these aluminum flakes because the aluminum flakes have a shape approximate to a circle, and hence 2.5 (g/cm³) rather than 2.7 (g/cm³) is used as a correction value.

While the average thickness of the aluminum flakes of the present invention obtained in the manner as described above is not particularly limited, it is preferably greater than or equal to 0.01 μm and less than or equal to 5 μm. An average thickness within this range is more advantageous in terms of brightness. On the other hand, an average thickness less than 0.01 µm is disadvantageous in terms of circulation, and an average thickness exceeding 5 µm leads the problem that in a paint film containing the aluminum flake paste, the aluminum flakes project from the paint film to impair the appearance. The average thickness of the aluminum flakes is more preferably greater than or equal to 0.03 µm and less than or equal to 1 µm.

The aluminum flakes for use in the present invention preferably have a shape coefficient obtainable by dividing the average particle size by the average thickness (referred to as "aspect ratio") greater than or equal to 50 and less than or equal to 200. This range is more advantageous in terms of the brightness. The aspect ratio is more preferably greater than or equal to 60 and less than or equal to 150.

<Organic Compound Having Polar Group>

The aluminum flake paste of the present invention contains an organic compound having a polar group. The organic compound having a polar group is identical to the organic compound having a polar group recited in the above description of the method for producing an aluminum flake paste. Specifically, the organic compound having a polar group contained in the aluminum flake paste of the present invention is at least one selected from the group consisting of a fatty acid, an aliphatic amine, a fatty acid amide, an aliphatic alcohol, and an ester of a fatty acid and an aliphatic alcohol.

The amount of the organic compound having a polar group contained in the aluminum flake paste is represented in terms of the amount of carbon. As a method for measuring the amount of carbon, a method of measuring the amount of carbon contained in the aluminum flake paste by means of an adhered carbon analyzing device (trademark: "K0918," available from Kojima Seisakusho Inc.) can be employed. Concretely, a certain amount of the aluminum flake paste is weighed, and dried to give powdery aluminum flakes. Then, the obtained powdery aluminum flakes are subjected to the adhered carbon analyzing device and the amount of carbon is measured, and thus measurement can be conducted.

The amount of the organic compound having a polar group contained in the aluminum flake paste of the present invention is preferably greater than or equal to 0.5% by mass, more preferably greater than or equal to 1.2% by mass, and further preferably greater than or equal to 1.5% by mass in terms of the amount of carbon, relative to the entire aluminum flake paste.

When the content is greater than or equal to 0.5% by mass, it is possible to keep the storage stability while enabling the aluminum flake paste of the present invention to impart high brightness.

While the upper limit of the content is not particularly limited as far as the storage stability is not affected, it is preferably less than or equal to 3.0% by mass in terms of the amount of carbon from the view point of adhesion properties of a paint film containing the aluminum flake paste.

In the method for producing an aluminum flake paste described above, the surface of the aluminum flakes is treated with an organic compound having a polar group in the second step. Therefore, the organic compound having a polar group is adhered to the surface of the aluminum flakes in the finally obtained aluminum flake paste. While the organic compound having a polar group in the aluminum flake paste is preferably adhered to the surface of the aluminum flakes, the state of the compound is not limited to this, and it may be present in the paste-forming solvent.

<Other Additives>

In the aluminum flake paste of the present invention, other additives may be further contained as far as the effect of the present invention is not hindered. Such additives may be adhered to the surface of the aluminum flakes, or may be contained in the aluminum flake paste.

Examples of such other additives include an antioxidant as described in the foregoing method for producing an aluminum flake paste, and various compounds for imparting water resistance, chemical resistance, and weather resistance.

<Metallic Colored Matter>

The present invention also relates to a metallic colored matter containing the aluminum flake paste of the present invention. Examples of the metallic colored matter include paint compositions, ink compositions (including those for inkjet), resin molded articles, and cosmetics.

Examples of the paint compositions or the ink compositions include compositions containing an aluminum flake paste, a resin component and a solvent.

On the other hand, examples of the resin molded articles include resin molded articles into which the aluminum flakes are kneaded by using the aluminum flake paste. The resin molded articles in this context include not only final molded articles, but also intermediate products in process such as a master batch for synthetic resin coloring containing aluminum flakes to be used for the purpose of blending into a base resin, and a metallic coloring pellet produced by kneading the master batch for synthetic resin metallic coloring and the base resin to give a pellet. Examples of the base resin include acrylic resins, polypropylene resins, polyethylene resins, polyester resins, alkyd resins, epoxy resins, polyurethane resins, and polyvinyl resins.

Non-limitative examples of the cosmetics include makeup cosmetics such as lipstick, foundation, rouge, eye shadow, nail enamel and mascara, hair cosmetics such as hair gel, hair wax, hair treatment, shampoo and hair manicure, and skin care cosmetics such as toning lotion, foundation cream and sunscreen.

EXAMPLES

Hereinafter, the present invention will be described more specifically by way of examples, however, the present invention is not limited to these examples. The average particle size (D50) of the raw material aluminum powder used in examples and comparative examples was measured by a laser diffraction type particle size distribution measuring device as will be described later.

Example 1

In a cylindrical ball mill having a diameter of 500 mm and a length of 180 mm, 50 kg of steel balls having a diameter of 0.7 mm as grinding media, 1000 g of a raw material aluminum powder having an average particle size of 7.8 µm, 4 L of a solvent of 100% aromatic hydrocarbon (trademark: "SS-100," available from JX Nippon Oil & Energy Corporation) containing 42% of trimethylbenzene as an organic solvent containing an aromatic hydrocarbon as a main ingredient, which is a grinding solvent, and 100 g of oleic acid as a grinding aid were charged, and the raw material aluminum powder was flaked at a number of revolutions of 50 rpm (84% of the critical number of revolutions) for 1 hour to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (the first step). This filter cake contained 85% by mass of aluminum flakes as a non-volatile matter, and the remainder contained the mineral spirit.

The filter cake obtained above was transferred into a kneader mixer. Then, oleic acid serving as an organic compound having a polar group was added in an amount of 2% by mass to the solid content of the aluminum flakes in the kneader mixer, and the aluminum flakes were treated with the aromatic hydrocarbon having a polar group, and kneaded for 1 hour in the kneader mixer to give a paste, and thus an aluminum flake paste (containing 70% by mass of aluminum flakes as a non-volatile matter) in which the mineral spirit serves as a paste-forming solvent was obtained (the second step).

Comparative Example 1

An aluminum flake paste (containing 70% by mass of aluminum flakes as a non-volatile matter) in which the mineral spirit serves as a paste-forming solvent was obtained by a method similar to Example 1 except that the organic solvent containing an aromatic hydrocarbon as a main ingredient serving as a grinding solvent used in the first step of Example 1 was changed to mineral spirit (main ingredient: aliphatic hydrocarbon), and addition of oleic acid in the second step was not conducted.

Example 2

Aluminum flakes (as a filter cake) were obtained by conducting the first step by a method similar to Example 1 except that the time for flaking by the ball mill was changed to 17 hours. This filter cake contained 85% by mass of aluminum flakes as a non-volatile matter, and the remainder contained the mineral spirit. Then, for the obtained filter cake, the second step was conducted by a method similar to Example 1 to give an aluminum flake paste (containing 70% by mass of aluminum flakes as a non-volatile matter) in which the mineral spirit serves as a paste-forming solvent.

Example 3

Aluminum flakes (as a filter cake) were obtained by conducting the first step by a method similar to Example 1 except that the average particle size of the raw material aluminum powder was changed to 4.2 µm and the time for flaking by the ball mill was changed to 17 hours. This filter cake contained 85% by mass of aluminum flakes as a non-volatile matter, and the remainder contained the mineral spirit. Then, for the obtained filter cake, the second step was conducted by a method similar to Example 1 to give an aluminum flake paste (containing 70% by mass of aluminum flakes as a non-volatile matter) in which the mineral spirit serves as a paste-forming solvent.

Example 4

Aluminum flakes (as a filter cake) were obtained by conducting the first step by a method similar to Example 1 except that the average particle size of the raw material aluminum powder was changed to 2.7 µm and the time for flaking by the ball mill was changed to 17 hours. This filter cake contained 85% by mass of aluminum flakes as a non-volatile matter, and the remainder contained the mineral spirit. Then, for the obtained filter cake, the second step was conducted by a method similar to Example 1 to give an aluminum flake paste (containing 70% by mass of aluminum flakes as a non-volatile matter) in which the mineral spirit serves as a paste-forming solvent.

Examples 5 to 9

Aluminum flakes (as a filter cake) were obtained by conducting the first step by a method similar to Example 1 except that the average particle size of the raw material aluminum powder was changed to 4.2 µm and the time for flaking by the ball mill was changed to 17 hours. This filter cake contained 85% by mass of aluminum flakes as a non-volatile matter, and the remainder contained the mineral spirit. Then, for the obtained filter cake, the second step was conducted by a method similar to Example 1 except that the "organic compound having polar group in second step" shown in Table 1 was used in the second step to give an aluminum flake paste (containing 70% by mass of aluminum flakes as a non-volatile matter) in which the mineral spirit serves as a paste-forming solvent.

Reference Example 1

An aluminum flake paste (containing 70% by mass of aluminum flakes as a non-volatile matter) in which the mineral spirit serves as a paste-forming solvent was obtained by a method similar to Example 3 except that addition of oleic acid as an organic compound having a polar group was not conducted in the second step.

Comparative Example 2

In a cylindrical ball mill having a diameter of 500 mm and a length of 180 mm, 50 kg of steel balls having a diameter of ⅛ inch as grinding media, 1000 g of a raw material aluminum powder having an average particle size of 17.0 µm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 5 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 71% by mass of aluminum flakes as a non-volatile matter) in which the mineral spirit serves as a paste-forming solvent was obtained (corresponding to the second step).

Comparative Example 3

In a cylindrical ball mill having a diameter of 500 mm and a length of 180 mm, 50 kg of steel balls having a diameter of 1.5 mm as grinding media, 1000 g of a raw material aluminum powder having an average particle size of 5.7 µm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 8 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 75% by mass of aluminum flakes as a non-volatile matter) in which the mineral spirit serves as a paste-forming solvent was obtained (corresponding to the second step).

Comparative Example 4

In a cylindrical ball mill having a diameter of 500 mm and a length of 180 mm, 50 kg of steel balls having a diameter of 2.0 mm as grinding media, 1000 g of a raw material aluminum powder having an average particle size of 8.0 μm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 7 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 71% by mass of aluminum flakes as a non-volatile matter) in which the mineral spirit serves as a paste-forming solvent was obtained (corresponding to the second step).

Comparative Example 5

In a cylindrical ball mill having a diameter of 500 mm and a length of 180 mm, 50 kg of steel balls having a diameter of 2.0 mm as grinding media, 1000 g of a raw material aluminum powder having an average particle size of 5.7 μm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 8 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 71% by mass of aluminum flakes as a non-volatile matter) in which the mineral spirit serves as a paste-forming solvent was obtained (corresponding to the second step).

Comparative Example 6

In a cylindrical ball mill having a diameter of 500 mm and a length of 180 mm, 50 kg of steel balls having a diameter of 0.5 mm as grinding media, 1000 g of a raw material aluminum powder having an average particle size of 4.2 μm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 13 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 70% by mass of aluminum flakes as a non-volatile matter) in which the mineral spirit serves as a paste-forming solvent was obtained (corresponding to the second step).

Comparative Example 7

In a cylindrical ball mill having a diameter of 500 mm and a length of 180 mm, 50 kg of steel balls having a diameter of 1.2 mm as grinding media, 1000 g of a raw material aluminum powder having an average particle size of 7.6 μm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 9 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 71% by mass of aluminum flakes as a non-volatile matter) in which the mineral spirit serves as a paste-forming solvent was obtained (corresponding to the second step).

Comparative Example 8

In a cylindrical ball mill having a diameter of 500 mm and a length of 180 mm, 50 kg of steel balls having a diameter of 0.7 mm as grinding media, 1000 g of a raw material aluminum powder having an average particle size of 7.0 μm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 12 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 74% by mass of aluminum flakes as a non-volatile matter) in which the mineral spirit serves as a paste-forming solvent was obtained (corresponding to the second step).

Comparative Example 9

In a cylindrical ball mill having a diameter of 500 mm and a length of 180 mm, 50 kg of steel balls having a diameter of 0.7 mm as grinding media, 1000 g of a raw material aluminum powder having an average particle size of 5.0 µm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 12 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 71% by mass of aluminum flakes as a non-volatile matter) in which the mineral spirit serves as a paste-forming solvent was obtained (corresponding to the second step).

Comparative Example 10

In a cylindrical ball mill having a diameter of 500 mm and a length of 180 mm, 50 kg of steel balls having a diameter of 0.7 mm as grinding media, 1000 g of a raw material aluminum powder having an average particle size of 3.6 µm, 4 L of mineral spirit (main ingredient: aliphatic hydrocarbon) as a grinding solvent, and 100 g of oleic acid as a grinding aid were charged, and the raw material aluminum powder was flaked at a number of revolutions of 50 rpm (84% of the critical number of revolutions) for 13 hours to give a slurry containing aluminum flakes. After completion of the flaking, the slurry containing aluminum flakes in the ball mill was washed out with mineral spirit, and subjected to vibration screens of 150 mesh, 350 mesh, and 400 mesh sequentially, and the passed slurry was solid-liquid separated by a pan filter to give aluminum flakes (as a filter cake) (corresponding to the first step). This filter cake contained 85% by mass of aluminum flakes as a non-volatile matter, and the remainder contained the mineral spirit.

The filter cake obtained above was transferred into a kneader mixer. By kneading for 1 hour in the kneader mixer to give a paste, an aluminum flake paste (containing 70% by mass of aluminum flakes as a non-volatile matter) in which the mineral spirit serves as a paste-forming solvent was obtained (corresponding to the second step).

The amount of the aromatic hydrocarbon contained in the mineral spirit used as a grinding solvent in Comparative Examples 1 to 10 was about 30% by mass with respect to the amount of the whole of the organic solvent which is a grinding solvent.

<Evaluation>
<Circularity>

The circularity of aluminum flakes in each of the aluminum flake pastes obtained in Examples 1 to 9, Reference Example 1 and Comparative Examples 1 to 10 was determined in the following manner. More specifically, varnish (trademark: "Autoclear," available from NIPPONPAINT Co., Ltd.) was added to each aluminum flake paste (as 0.2 g of solid content) obtained in examples and comparative examples so that the total weight was 50 g, and the mixture was stirred by a stirring deaerator (trademark: "MAZERUSTAR," available from KURABO INDUSTRIES LTD.) to give a paint composition. Then, the obtained paint composition was applied to a hiding power test paper (trademark: "Hiding power test chart," available from T.P GIKEN) by means of a 1 mil doctor blade, and dried to give a painted chart. Subsequently, a picture of aluminum flakes in the painted chart was taken by a digital microscope (trademark: "VHX-1000," available from KEYENCE Corporation). Subsequently, by image analyzing the picture of the aluminum flakes by using image analysis measurement processing software (trademark: "Image-Pro Plus version 4.0," available from Planetron, Inc.), the surface area and the circularity of every aluminum flake were measured. Among all of the measured aluminum flakes, aluminum flakes having a surface area greater than or equal to 250 µm$^2$ were selected, and an average value of the circularity of the aluminum flakes having a surface area greater than or equal to 250 µm$^2$ was determined. The results are shown in Table 1.

<Brightness>

The brightness of each of the aluminum flake pastes obtained in Examples 1 to 9, Reference Example 1 and Comparative Examples 1 to 10 was determined in the following manner. That is, after adding 14.58 g by metal mass of each aluminum flake paste to 41.67 g of a thinner (trademark: "nax Admila 500 standard thinner," available from NIPPONPAINT Co., Ltd.) and dispersing the paste with a glass rod, the dispersion was stirred and dispersed together with 213.68 g of acrylic clear resin (trademark: "nax Admila 280 correcting clear," available from NIPPONPAINT Co., Ltd.) and 35.77 g of synthetic resin clear paint (trademark: "nax Admila 901 binder," available from NIPPONPAINT Co., Ltd.) by a disperser at 1000 rpm for 15 minutes to give a paint composition precursor. To the obtained paint composition precursor, an equivalent amount of thinner was added to give a paint composition.

Also, 100 g of acrylic urethane resin (trademark: "nax Multi (10:1)240 2 coat clear," available from NIPPONPAINT Co., Ltd.) and 10 g of a hardener (trademark: "nax Multi(10:1)#20 hardener," available from NIPPONPAINT Co., Ltd.) were added to 20 g of a thinner (trademark: "nax Multi #20 standard urethane thinner," available from NIPPONPAINT Co., Ltd.) and dispersed with a glass rod, to prepare a top coating agent.

Then, the paint composition and the top coating agent described above were sequentially applied to a middle-coat-painted 0.3×200×300 mm tin plate (trademark: "P-32 plate," available from Nippon Route Service Co., Ltd.) by an automated spray coater (trademark: "P903 gun," available from ABB K. K.) to prepare a coated plate.

The coating was conducted in such a manner that after coating with a paint composition so that the dry thickness was 12±2 μm in the conditions: reciprocator speed of 50 m/min., conveyor moving speed of 2 m/min., spraying distance of 30 cm, and atomization pressure of 0.35 MPa, in a coating room at a room temperature of 22±1° C. and a relative humidity in the room of 55±5% RH, flushing off was conducted at 80° C. for 5 minutes, and then a top coating agent was applied so that the dry thickness was 45±5 μm. Baking was conducted at 140° C. for 30 minutes.

For the prepared coated plate, by measuring L value (L*15°) at the incident angle of 45° and the offset angle of 15° from the specular direction by means of a varied-angle color meter (trademark: "MA-68," available from X-Rite Inc.), brightness of the paint film was evaluated. Here, the higher the L value is, the higher the brightness is. The results are shown in Table 1.

<Average Particle Size>

For the raw material aluminum powder used in Examples 1 to 9, Reference Example 1 and Comparative Examples 1 to 10, and aluminum flakes in each of the aluminum flake pastes obtained in Examples 1 to 9, Reference Example 1 and Comparative Examples 1 to 10, the average particle size (D50) was measured in the following conditions by means of a laser diffraction type particle size distribution measuring device (trademark: "Micro Track HRA," available from Honeywell International Inc.).

(In the Case of Raw Material Aluminum Powder)

A mixture of 0.5 g of a raw material aluminum powder, 0.1 g of a 10% hexametaphoshporic acid solution in water, and 30 g of ion exchange water was stirred with a glass rod, put into circulating water in the measurement system, ultrasonically dispersed for 2 minutes, and then the particle size of D50 was measured.

(In the Case of Aluminum Flakes)

A mixture of 0.5 g of the aluminum flake paste obtained in Examples 1 to 9, Reference Example 1 and Comparative Examples 1 to 10 and 5.0 g of toluene was stirred with a glass rod, put into circulating water in the measurement system, ultrasonically dispersed for 30 seconds, and then the particle size of D50 of the aluminum flakes was measured. The measurement result of average particle size of aluminum flakes is shown in Table 1. The average particle size of aluminum flakes in this context corresponds to the average particle size "directly after preparation" in the later-described evaluation of storage stability.

<Storage Stability>

Storage stability of the aluminum flake pastes obtained in Example 1, Examples 5 to 9, Reference Example 1 and Comparative Example 1 was examined in the following manner. Specifically, for an aluminum flake paste directly after preparation, the particle size distribution of aluminum flakes was measured. Then, the aluminum flake paste was stored at a constant-temperature room at 50° C. for three months, and the particle size distribution of aluminum flakes in the aluminum flake paste after storage was measured. Then, the particle size distribution of aluminum flakes directly after preparation was compared with the particle size distribution of aluminum flakes after storage for three months.

The aforementioned particle size distribution was measured by using a laser diffraction type particle size distribution measuring device (trademark: "Micro Track HRA," available from Honeywell International Inc.), and the particle size of D50 was determined. Then, the difference in particle size of D50 was compared. When the difference in particle size of D50 was less than or equal to 3% as a result of the comparison, the temporal stability was determined as good. The results are shown in Table 1.

<Water Covering Area (WCA)>

The water covering area of aluminum flakes in each of the aluminum flake pastes obtained in Examples 1 to 9, Reference Example 1 and Comparative Examples 1 to 10 was determined according to JIS K 5906:1998. Specifically, 2.0 g by solid content of an aluminum flake paste was weighed on a glass filter. Then, the glass filter was set in an aspiration bottle, and the paste was dispersed with a glass rod while 40 mL of n-hexane was added to give a dispersion. Subsequently, the dispersion was allowed to pass through the glass filter by aspiration, and thus filtered and washed. Then, the operation of adding n-hexane and dispersing the paste, and washing the dispersion by aspiration was repeated four times to give a powder of aluminum flakes. Subsequently, 1.0 g of the obtained powder of aluminum flakes was added to a 100-mL beaker together with 2 mL of 5% by mass stearic acid solution in mineral spirit, and dispersed with a glass rod. Then, 50 mL of mineral spirit was added, and warmed at 45° C. for 2 hours in an oven. Then, the solution was filtered by aspiration through another glass filter. Subsequently, n-hexane was added, followed by dispersion, aspiration for 1 hour, and drying to give a measurement sample.

Subsequently, on a small watch glass from which the oil on the surface was removed, about 0.02 to 0.03 g of the above measurement sample was collected. For 0.001 g of the measurement sample, butyl alcohol was dropped several times (about 0.02 mL per one drop) and the sample was dispersed with a glass rod. The watch glass on which the measurement sample resides was dipped under the liquid surface of a trough filled with water. Then, by stirring the liquid level with a glass rod so that the film of the aluminum flakes on the liquid surface of the trough was uniform, a uniform film of aluminum flakes was allowed to form. Then, the outer circumference of the film of aluminum flakes (concretely, the lengths of the upper side, the lower side and the lateral side) was measured by a measuring scale, and water covering area (WCA) of aluminum flakes was calculated according to the following formula.

WCA (cm$^2$/g)=[{length of upper side of film of aluminum flakes (cm)+length of lower side of film of aluminum flakes (cm)}×length of lateral side of film of aluminum flakes (cm)/2]/sample amount (g)

<Ratio Between Water Covering Area (cm$^2$/g) and Circularity>

Ratio between the water covering area (cm$^2$/g) and the circularity was calculated for Examples 1 to 9, Reference Example 1 and Comparative Examples 1 to 10. The results are shown in Table 1.

<Amount of Organic Compound Having Polar Group>

The amount of the organic compound having a polar group contained in each of the aluminum flake pastes obtained in Examples 1 to 9 (including the organic compound having a polar group adhered to the surface of the aluminum flakes) was measured in the following manner. Specifically, 2.0 g of an aluminum flake paste was dried at 140° C. for 1 hour, to give powdery aluminum flakes. The obtained powdery aluminum flakes were set in an adhered carbon analyzing device (trademark: "K0918," available from Kojima Seisakusho Inc.), and the amount of carbon contained in the aluminum flakes was measured and taken as the amount of the organic compound having a polar group contained in the aluminum flake paste.

For comparison with examples, amounts of carbon contained in the aluminum flake pastes obtained in Reference Example 1 and Comparative Example 1 were measured in the same manner as for Examples 1 to 9.

The measurement results of the amount of carbon in Examples 1 to 9, Reference Example 1 and Comparative Example 1 are shown in Table 1.

Figure 2:
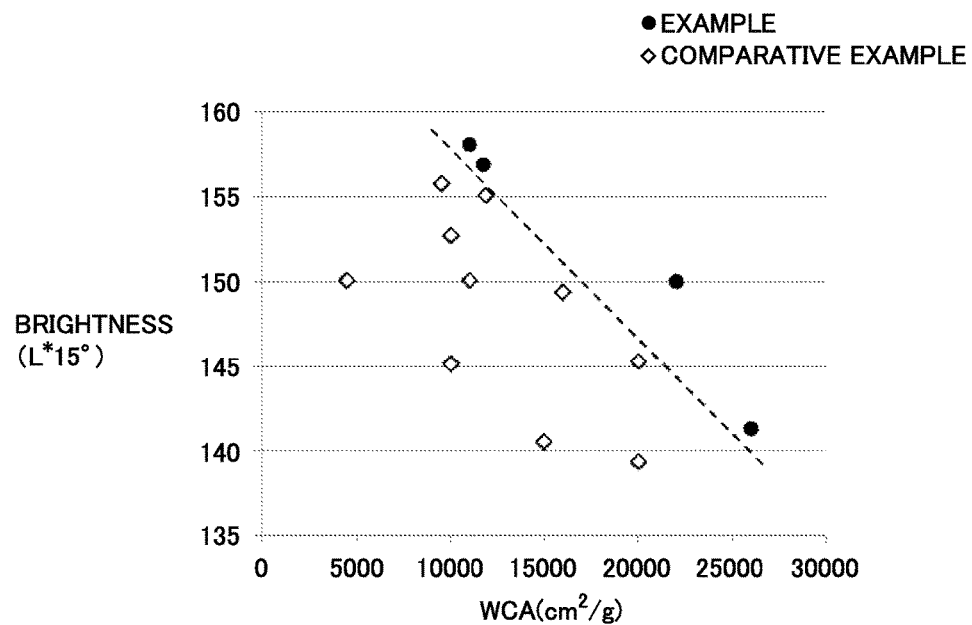
FIG. 2 is a scatter diagram showing a relationship between the water covering area (WCA) and the brightness in Examples 1 to 4 and Comparative Examples 1 to 10.

The relationship between the water covering area (WCA) and the circularity in Examples 1 to 4 and Comparative Examples 1 to 10 is shown in FIG. 1, and the relationship between the water covering area (WCA) and the brightness therein is shown in FIG. 2. The straight line in FIG. 1 has a slope of 6000 cm²/g (ratio between the water covering area and the circularity).

having a polar group as in Examples 1, 5, 7, and 8, but also in the case where an aliphatic alcohol was used as in Example 6 and in the case where an aliphatic amine was used as in Example 9.

Further, as is apparent from Table 1, comparing the aluminum flake pastes obtained in Examples 5, 7, and 8 which are different in the preparation method only in that the fatty acids used as the organic compound having a polar group in the second step have different numbers of carbon atoms, regarding the storage stability, the difference between directly after preparation and after three-months storage was 2.3% in Example 8 in which capric acid having 10 carbon atoms was used, whereas the difference between directly after preparation and after three-months storage was less

TABLE 1

|  | Main ingredient of organic solvent in first step | Organic compound having polar group in second step | A Water covering area (WCA) (cm²/g) | B Circularity | Ratio A/B WCA/circularity (cm²/g) | Brightness L*15° | Carbon amount (% by mass) | Particle size of aluminum flakes | | Storage stability (temporal change in particle size distribution) |
|---|---|---|---|---|---|---|---|---|---|---|
|  |  |  |  |  |  |  |  | Directly after preparation D50 (μm) | After three-months storage D50 (μm) | Difference between directly after preparation and after three-months storage (%) |
| Example 1 | Aromatic hydrocarbon | Oleic acid | 11800 | 1.62 | 7284 | 157 | 1.63 | 21.28 | 21.54 | 1.2 |
| Comparative Example 1 | Aliphatic hydrocarbon | — | 11900 | 2.04 | 5833 | 155 | 0.41 | 20.90 | 21.15 | 1.2 |
| Example 2 | Aromatic hydrocarbon | Oleic acid | 11000 | 1.66 | 6627 | 158 | 0.86 | 21.93 | — | — |
| Example 3 | Aromatic hydrocarbon | Oleic acid | 22000 | 2.08 | 10577 | 150 | 0.74 | 13.72 | — | — |
| Example 4 | Aromatic hydrocarbon | Oleic acid | 26000 | 3.41 | 7625 | 141 | 1.60 | 9.70 | — | — |
| Example 5 | Aromatic hydrocarbon | Oleic acid | 22000 | 1.85 | 11885 | 153 | 0.85 | 14.42 | 14.59 | 1.2 |
| Example 6 | Aromatic hydrocarbon | Oleyl alcohol | 22000 | 1.85 | 11885 | 152 | 0.76 | 14.40 | 14.71 | 2.2 |
| Example 7 | Aromatic hydrocarbon | Lauric acid | 22000 | 1.85 | 11885 | 152 | 0.78 | 14.40 | 14.65 | 1.7 |
| Example 8 | Aromatic hydrocarbon | Capric acid | 22000 | 1.85 | 11885 | 152 | 0.78 | 14.40 | 14.73 | 2.3 |
| Example 9 | Aromatic hydrocarbon | Lauryl amine | 22000 | 1.85 | 11885 | 153 | 0.82 | 14.36 | 14.63 | 1.9 |
| Reference Example 1 | Aromatic hydrocarbon | — | 22000 | 1.85 | 11885 | 151 | 0.44 | 14.37 | 15.54 | 8.1 |
| Comparative Example 2 | Aliphatic hydrocarbon | — | 4500 | 2.10 | 2143 | 150 | — | 29.96 | — | — |
| Comparative Example 3 | Aliphatic hydrocarbon | — | 10000 | 2.30 | 4348 | 145 | — | 15.22 | — | — |
| Comparative Example 4 | Aliphatic hydrocarbon | — | 15000 | 3.09 | 4854 | 141 | — | 17.23 | — | — |
| Comparative Example 5 | Aliphatic hydrocarbon | — | 20000 | 3.71 | 5391 | 139 | — | 15.41 | — | — |
| Comparative Example 6 | Aliphatic hydrocarbon | — | 16000 | 2.75 | 5818 | 149 | — | 11.41 | — | — |
| Comparative Example 7 | Aliphatic hydrocarbon | — | 9500 | 2.11 | 4502 | 156 | — | 21.51 | — | — |
| Comparative Example 8 | Aliphatic hydrocarbon | — | 10000 | 2.36 | 4237 | 153 | — | 16.65 | — | — |
| Comparative Example 9 | Aliphatic hydrocarbon | — | 11000 | 2.18 | 5046 | 150 | — | 13.67 | — | — |
| Comparative Example 10 | Aliphatic hydrocarbon | — | 20000 | 3.63 | 5510 | 145 | — | 10.73 | — | — |

As is apparent from Table 1, regarding the storage stability, the difference between directly after preparation and after three-months storage was less than or equal to 3% in any of Example 1, Examples 5 to 9 and Comparative Example 1. Moreover excellent storage stability of the obtained aluminum flake paste was confirmed not only in the case where a fatty acid was used as the organic compound than 2.0% in Example 5 in which oleic acid having 18 carbon atoms was used and in Example 7 in which lauric acid having 12 carbon atoms was used. Therefore, it is revealed that an excellent result of storage stability showing a difference between directly after preparation and after three-months storage of less than 2% can be obtained by a fatty acid having greater than or equal to 12 carbon atoms.

On the other hand, in the aluminum flake paste obtained in Reference Example 1 in which an organic compound having a polar group was not added in the second step, the difference between directly after preparation and after three-months storage was as large as 8.1%. Therefore, it is supposed that the storage stability is poor and aggregation occurs due to temporal change.

Therefore, it was confirmed that the aluminum flake paste of the present invention shows excellent storage stability.

It is apparent from Table 1 and FIG. 1 that Examples 1 to 9 have ratios A/B greater than or equal to 6000 (cm$^2$/g), and Comparative Examples 1 to 10 have ratios A/B of less than 6000 (cm$^2$/g). Therefore, it was confirmed that the aluminum flake paste prepared by the method for producing an aluminum flake paste of the present invention has a ratio A/B greater than or equal to 6000 (cm$^2$/g).

As is apparent from Table 1 and FIG. 2, for a fixed water covering area (WCA) in Examples 1 to 4 and Comparative Examples 1 to 10 (comparison at the same numerical water covering area), Examples 1 to 4 showed more excellent brightness than Comparative Examples 1 to 10. Therefore, it was confirmed that the aluminum flake paste of the present invention shows excellent brightness.

While the description has been made for the embodiments and examples of the present invention, it is originally intended to appropriately combine the constitutions of the embodiments and examples as described above.

It is to be noted that the embodiments and examples disclosed herein are given for exemplification but not for limitation in all aspects. It is intended that the scope of the present invention is defined by claims rather than by the above description, and any modifications within the equivalent meanings and ranges of claims are embraced.

The invention claimed is:

1. An aluminum flake paste containing aluminum flakes, wherein letting the water covering area (cm$^2$/g) of the whole of said aluminum flakes contained in said aluminum flake paste be A, and letting the circularity of said aluminum flakes having a surface area greater than or equal to 250 μm$^2$ be B, the ratio AB is greater than or equal to 6000 (cm$^2$/g),
   said aluminum flakes are produced with the utilization of an aromatic hydrocarbon as a main ingredient in an organic solvent serving as a grinding aid,
   said main ingredient containing said aromatic hydrocarbon in an amount of at least 70% by mass based on the mass of the entire organic solvent, and wherein
   B is greater than or equal to 1.0 and less than or equal to 1.8,
   said aluminum flake paste contains an organic compound having a polar group,
   said organic compound having a polar group is contained in an amount of greater than or equal to 0.5% by mass and less than or equal to 3% by mass in terms of carbon amount, and
   a brightness of said aluminum flake paste, evaluated by measuring an L value (L*15°), is greater than 156 and less than or equal to 158.

2. The aluminum flake paste according to claim 1, wherein in said aluminum flake paste, the difference between a particle size of D50 of said aluminum flakes directly after preparation and a particle size of D50 of said aluminum flakes after storage of three months in a constant temperature room at 50° C. is less than or equal to 3%.

3. The aluminum flake paste according to claim 1, wherein said organic compound having a polar group is at least one selected from the group consisting of a fatty acid, an aliphatic amine, a fatty acid amide, an aliphatic alcohol, and an ester of a fatty acid and an aliphatic alcohol.

4. A metallic colored matter comprising the aluminum flake paste according to claim 1.

5. A method for producing the aluminum flake paste according to claim 1, comprising:
   a first step of flaking a raw material aluminum powder in an organic solvent containing an aromatic hydrocarbon as a main ingredient to give aluminum flakes; and
   a second step of treating said aluminum flakes obtained in said first step with an organic compound having a polar group, and forming the treated flakes into a paste,
   wherein said first step includes a step of changing the whole or part of said organic solvent containing an aromatic hydrocarbon as a main ingredient to a solvent having lower solubility with respect to said organic compound having a polar group, after obtaining the aluminum flakes by flaking the raw material aluminum powder.

6. The method for producing an aluminum flake paste according to claim 5, wherein said organic compound having a polar group is at least one selected from the group consisting of a fatty acid, an aliphatic amine, a fatty acid amide, an aliphatic alcohol, and an ester of a fatty acid and an aliphatic alcohol.

7. An aluminum flake paste containing aluminum flakes produced with the utilization of an aromatic hydrocarbon as a grinding solvent and an organic compound with a polar group as a grinding aid, wherein the ratio AB of the water covering area (cm$^2$/g) of the whole of the aluminum flakes contained in the aluminum flake paste (A) and the circularity of the aluminum flakes having a surface area equal to or greater than 250 μm$^2$ (B), is greater than or equal to 6000 (cm$^2$/g),
   said aromatic hydrocarbon is a main ingredient in an organic solvent serving as said grinding aid,
   said main ingredient containing said aromatic hydrocarbon in an amount of at least 70% by mass based on the mass of the entire organic solvent, and wherein
   B is greater than or equal to 1.0 and less than or equal to 1.8,
   said organic compound with a polar group is contained in an amount of greater than or equal to 0.5% by mass and less than or equal to 3% by mass in terms of carbon amount, and
   a brightness of said aluminum flake paste, evaluated by measuring an L value (L*15°), is greater than 156 and less than or equal to 158.

8. The aluminum flake paste of claim 7, wherein the aromatic hydrocarbon is selected from the group consisting of 1, 2, 4-trimethylbenzene, 1, 3, 5-trimethylbenzene, xylene, cumene, naphthalene and nitro group and halogen group derivatives thereof.

9. The aluminum flake paste of claim 7, wherein the organic compound having a polar group is at least one member selected from the group consisting of a fatty acid, an aliphatic amine, a fatty acid amide, an aliphatic alcohol, and an ester of a fatty acid and an aliphatic alcohol.

\* \* \* \* \*